(12) United States Patent
Grober

(10) Patent No.: US 7,490,572 B2
(45) Date of Patent: Feb. 17, 2009

(54) AUTONOMOUS, SELF LEVELING, SELF CORRECTING ANTI-MOTION SICKNESS CHAIR, BED AND TABLE

(76) Inventor: David E. Grober, 616 Venice Blvd., Venice, CA (US) 90291

( * ) Notice: Subject to any disclaimer, the term of this patent is extended or adjusted under 35 U.S.C. 154(b) by 676 days.

(21) Appl. No.: 10/647,892

(22) Filed: Aug. 25, 2003

(65) Prior Publication Data

US 2004/0035347 A1 Feb. 26, 2004

(51) Int. Cl.
*B63B 29/12* (2006.01)
(52) U.S. Cl. .......................................... 114/191; 396/55
(58) Field of Classification Search ................. 114/191, 114/194, 195, 264, 343, 364; 396/7, 12, 396/13, 52, 55, 419, 428
See application file for complete search history.

(56) References Cited

U.S. PATENT DOCUMENTS

| | | | | |
|---|---|---|---|---|
| 1,121,617 A | * | 12/1914 | Drocar | 114/191 |
| 2,206,100 A | * | 7/1940 | McCormick et al. | 114/191 |
| 4,713,851 A | * | 12/1987 | Rosquist | 5/118 |
| 4,930,435 A | | 6/1990 | Newman | |
| 5,119,754 A | | 6/1992 | Martinez | |
| 5,822,813 A | | 10/1998 | Powell | |
| 6,611,662 B1 | | 8/2003 | Grober | |

* cited by examiner

*Primary Examiner*—Lars A Olson

(57) ABSTRACT

A chair is stabilized in two orthogonal axis, pitch and roll, can hold a person stable in relation to the horizon. This solution to motion sickness is effective because the fluid in the inner ear no longer moves in relationship to the vehicle motion upon which the person is located. Therefore a main cause of motion sickness is substantially reduced or eliminated. Additionally, the invention can be a table, a bed, or even an entire room that is isolated from the rolling, pitching and jolting imparted by the host vehicle. Additionally, some applications such as a chair and table, may be stabilized in a third orthogonal axis, azimuth.

20 Claims, 5 Drawing Sheets

AUTONOMOUS, SELF LEVELING, SELF CORRECTING ANTI-MOTION SICKNESS CHAIR, BED AND TABLE

BACKGROUND OF THE INVENTION

It is desirable when traveling on vehicles, primarily boats, but which may also encompass land, air and undersea vehicles, to reduce or eliminate the pitch and roll which is associated with and induces motion sickness. Motion sickness is normally treated with anti motion sickness drugs. Their use is generally effective if used prior to experiencing motion sickness. Some people are unable to use motion sickness remedies due to medication conflicts. Additionally, once a person exhibits the effects of motion sickness, which may include nausea and vomiting, medications are relatively ineffective. Once motion sickness is exhibited, the common remedy is to stay out of enclosed spaces and stare at the horizon in order to reduce input of visual motion to the brain while stabilizing the head, subsequently reducing the motion of the inner ear fluid.

It would be desirable to stabilize a person so that the inner ear fluid remains calm, and the ability to view the horizon is simplified. The primary object of this invention is to provide an autonomous, self leveling, self correcting stabilizing platform which provides high payload to invention weight ratios, small size, high shock tolerance, ease of use, and minimal environmental restrictions. The invention provides a simple solution to personal stabilization, and can be used by a single person as a stabilized chair, table or bed. The invention can also be scaled to stabilize medical beds with an attached walkway and work stations for medical personnel and their equipment to be stabilized in relation to the patent. In another embodiment the appropriate scaling and platform mechanics can stabilize an entire room such as a medical operating room inside a ship where the room needs to be stabilized in relation to the ship's movements in order to effectively carry out delicate or complex medical procedures.

BRIEF DESCRIPTION OF THE RELATED ART

The basis for this invention is a small, light weight to payload stabilization system such as that described in Grober application Ser. No. 09/579,723, filed May 26, 2000, which will issue as U.S. Pat. No. 6,611,662, Autonomous, Self Leveling, Self Correcting Stabilized Platform, hereby incorporated by reference and from which priority is claimed. The present invention is a continuing application to Grober, Ser. No. 09/579,723 which describes a stabilized platform which is small, lightweight and uses a novel inexpensive sensor system to stabilize the payload platform. The payload platform can receive a chair, table or other device needing stabilization. The payload platform can also be operated in an inverted position, thus allowing an item needing stabilization to be hung from the stabilized platform. Additional differences to related art are listed below.

Powell, U.S. Pat. No. 5,822,813 discloses a stabilized platform in FIG. 1 to which can be attached a bed. Powell does not provide a stabilization system that is autonomous or self correcting because it does not monitor the actual position of the stabilized object.

Powell senses the position of the apparatus with respect to a predetermined reference plane such as a normally level position, but the sensors or gyro sense the instantaneous position of the deck with respect to an absolute level, virtual reference plane.

Powell does not teach how or where this absolute level, virtual reference plane is maintained either mathematically or physically so as to allow the gyro reference to continually sense its position with respect to that level plane. Servos are connected to a control system that is not shown. Therefore the control system and its reference sensor for this absolute level reference plane are not placed upon the stable platform. They are located remotely and there are no teachings on how Powell intends to accomplish this.

All sensors exhibit output variations due to temperature, accelerations, manufacturing bias and scale factor errors. Simply put, they are not perfect. Sensor imperfections compound themselves over time and generally exhibit as drift.

Powell does not monitor the level state of the stabilized platform. In Column 4 line 23 he says; "The apparatus actuators move the apparatus, and the difference between its new position and its old position is sensed by the position sensor 10." The type of sensor that measures absolute difference would be a motor encoder or similar. Gyros and rate sensors with bias and scale factor errors would lead to unaccounted time drift if used for this purpose.

Therefore, Powell's platform will drift over time by virtue of sensor errors which will compound over time. Therefore, Powell is not autonomous, self leveling nor self correcting.

In one embodiment the present invention the stabilized payload platform is autonomous and self-correcting. Two sensor packages are used. Each sensor package comprises one or more sensors.

Sensor package A is located on the vehicle, vessel, or the stabilizing device at any location where sensor package A can sense the motion of the vehicle that the stabilized payload platform is stabilizing against.

Sensor package B is comprised of sensor means including at least one level sensor. Level sensors sense acceleration and can sense the vector of gravity, AKA, earth's gravity, of which the perpendicular visual reference is the horizon. The vector of gravity sensed by level sensors is further affected by additional acceleration forces operating on the sensor. The sum total of these accelerations acting on the sensor produce a result known as the vector of apparent gravity, or simply apparent gravity. Level sensors sense this sum total of accelerations or apparent gravity, of which the perpendicular visual reference can be seen in a carpenter's bubble level if it were attached to the sensor. Sensor package B is fixed to the device in any location where it can sense the orientation of the payload platform, or at any location where it can sense the vector of apparent gravity, and which the control system can then calculate the required reference to the orientation of the payload platform. In one embodiment this can be achieved through the use of encoders or potentiometers on the gimbal to measure the framework angles that can be used to calculate the relationship between the payload platform and the vector of apparent gravity. Another embodiment could use encoders on the motor to provide this set of relative relationships.

The bias and scale factor errors of sensor package A measuring vehicle motion, can be corrected over time by the use of level sensors. Level sensors provide the reference for the payload platform orientation to level, therefore using these two sensor packages makes the device autonomous and self correcting. Another advantage in this embodiment is that the level sensor will sense apparent gravity, which, as used in this patent, provides the vector for the orientation of the payload platform when the orientation solution is designed to keep the occupant feeling the equivalent of the equivalent of earth's gravity even when the vehicle or platform experiences additional accelerations such as when the vehicle is speeding up, slowing down, or turning. The application of the apparent gravity effect on a occupant or payload is that in a turn, the stabilized payload platform will "bank" or orient itself so that the occupant feels as if they are level with the earth's gravity such as if they were sitting, standing or lying still. Without this banking effect, the apparent gravity exhibited such as in turns, will cause the occupant to feel as if gravity were pulling them out of their seat. This effect is demonstrated in an airplane turn wherein the aircraft does not bank or orient itself properly. The occupants feel as if they are being thrown to the side of their seats. If the proper bank or orientation is applied, there is no occupant sensation that the aircraft is proceeding through a turn because the occupant stays positioned relative to the apparent gravity vector.

Wherein eliminating motion sickness requires that the sense of motion be removed, the present invention can automatically orient to remove the effects of acceleration forces by banking or orienting the payload platform to counter the sensations induced by acceleration forces. In addition, the use of the two sensor packages, one measuring vehicle motion and the other measuring apparent gravity, coupled with the control system means to provide a payload platform orientation solution, and which can include a variable hardware control such as a potentiometer, software control, and which can be adjusted to position or orient the payload platform relative to the apparent gravity horizon, orient relative to the earth's horizon, or orient relative to variations in between.

The stabilized payload platform's orientation, based upon either the apparent gravity vector, the earth's gravity vector, or variations or combinations in between, can be varied in one embodiment by applying algorithms to the relationship between the utilization of sensor package A data and sensor package B data. The relationship between the sensor packages includes any methods for achieving relative relationships between the sensor's data contribution to the payload platform's orientation solution and can include relationships including sensor voltages, bandwidths, filters or other methods. In one embodiment's orientation solution, if the vehicle motion data of sensor package A is more heavily weighted or greater relative to the level sensor data provided by sensor package B, then the stabilized payload platform will more closely orient to the vehicle's motion, which if it started level with the earth's horizon, would maintain level with the earth's horizon except for bias, drift or other errors including in the vehicle motion sensing package. If the vehicle motion data of sensor package A is less heavily weighted or less relative to the level sensor data of sensor package B, then the stabilized payload platform will more closely orient to the apparent gravity that is being exhibited upon the invention.

The stabilizing system may comprise means, such as a control system with its software or hardware, and control algorithms, to provide orientation solutions for stabilizing the payload platform to the absolutes of the earth's horizon and apparent gravity horizon, to the range of positions or orientations relative to or in between the earth's horizon and apparent gravity horizon.

The stabilizing system having the means to orient the stabilized payload platform to one or more stabilized orientations, includes any stabilizing system to which means can be incorporated to orient the payload platform to or relative to the earth's horizon, the apparent gravity horizon, or a range of orientations between the earth's horizon and the apparent gravity horizon.

These solutions include but are not limited to the use of analog devices such as variable potentiometers to adjust the relative input of sensor package A to sensor package B which then affects the payload platform's orientation. Wherein increasing the value of sensor package A relative to the value of sensor package B will increasingly orient the payload platform to the motion of the vehicle or moving object to which the device is attached, increasing the value of sensor package B relative to the value of sensor package A will increasingly orient the payload platform to the apparent gravity horizon. A software solution may also be invoked wherein an algorithm may be written to reflect the equivalent that when the value of sensor package A is increased relative to the value of sensor package B, the payload platform will increasingly orient to the motion of the vehicle or moving object to which the device is attached, and increasing the value of sensor package B relative to the value of sensor package A will increasingly orient the payload platform to the apparent gravity horizon.

The speed of stabilization or actuation, which can also be the response speed by the drive mechanism(s) orienting the payload platform, includes the payload platform response delay or anticipation of vehicle motion, as well as other attributes for the horizontal and azimuth angle of the payload platform.

The on/off controls for the device are also attributes that can be controlled by an operator which may be an occupant, a non occupant operator, a computer or control system.

In one embodiment the control system is comprised of at least one computer that has software or hardware that can be configured to process the data from sensor package A and sensor package B and compute the payload platform orientation solution to stabilize relative to the earth's horizon or stabilize relative to the apparent gravity horizon.

In another embodiment, the control system can also compute various stabilized platform orientations in between the orientation relative to the gravity vector, and relative to the apparent gravity vector. In another embodiment the means to do this consists of software, hardware, or a combination of both, which can bias sensor package A data in relation to sensor package B data or visa-versa. Another embodiment may comprise a potentiometer to change the gain of one sensor package in relation to another sensor package in order to obtain a stabilized payload platform orientation that can be varied. Means may also be employed, such as a computer, joystick or potentiometers to provide active or continually changing variables of the orientation relative to the outputs of sensor package A and sensor package B.

In any embodiment, the individual sensors comprising a sensor package may be located at different locations and not in the same physical sensor package. For instance, the sensors that sense the motion of the vehicle may be located on or relative to each of the drive mechanism's axis in order to sense rotation about that axis. In this case the sensors comprising that package, work to perform a unified function but are not in the same physical package.

The stabilized payload platform is the platform upon which occupants, payloads or other objects can be placed or attached. It is a rigid construction of one or more pieces, or a group of pieces that comprise any structure(s) that are stabilized from the motion of the vehicle or moving object to which the invention is attached.

The invention can stabilize in up to three axes including pitch, roll and yaw. This three axes set can be a reference relative to the earth's horizon or the three axes of the device itself and will be determined by the language of the claim. The yaw axis can also be referred to as the azimuth or as a compass heading. The device can maintain an azimuth orientation relative to a compass heading, an object, or other heading. Additional actuators can be added that will also stabilize the payload platform in one or more linear axes and which may include such devices as linear actuators or springs to reduce or eliminate shock and vibrations.

The "vector of gravity" is the vector that describes the acceleration force of gravity, and which runs through the center of the earth.

The "vector of apparent gravity" is the sum total of all accelerations acting on an object. If that object is a level sensor, it will sense the vector of apparent gravity and indicate a horizon perpendicular to the sum of the acceleration forces to which it is subjected.

The term "earth's horizon" is the same or equivalent to what is normally referred to as the horizon line or the two dimensional plane perpendicular to the vector of gravity.

The "apparent gravity horizon" is the same or equivalent to a horizon line or two dimensional plane perpendicular to the vector of apparent gravity.

The term "sensing motion about at least two axes" includes sensing at least one of rotational or linear motions along the specified axis.

Powell states in Column 3 line 49. "An important characteristic of the embodiment in FIG. 1 is its ability to respond to not only pitching and rolling motion, but also to vertical motion, that is motion up and down. The servos 4 are driven in and out longitudinally . . . The only limit on the platform's response to applied motion is it's ability to respond."

Powell solves vertical motion of the ship as long as the motion of the ship is no greater than the length of the actuator arm. But that is not a practical scenario.

When the ship crests a wave and starts downward, in Powell, the occupant trades the ship's gradual downward acceleration in favor of an identical reverse acceleration to trick the inner ear fluid into thinking there is no acceleration. But this only lasts until the actuator arm length is exhausted. If the actuator adjusts 1 foot per 1 foot of vessel vertical motion, and the actuator arm is two feet long, then once the boat drops 2 feet, the occupant reaches the limit of the actuator arm. The occupant's direction must suddenly reverse to match the vessel which is still going downward. The reversal is more severe than the initial descent of the vessel and can make the occupant more prone to motion sickness. Various algorithms can be applied to change the ratio of vessel vertical motion to actuator arm motion, but they are extremely complex and vary for every wave height encountered and each vessel's sea handling characteristics. In addition, an actuator movement of 2 feet to counter 10 foot waves at 10 second intervals is not compensation to prevent seasickness caused by vertical motion. For this reason, on a preferred embodiment, the Grober invention does not have vertical actuators.

Newman, U.S. Pat. No. 4,930,435 also teaches a stabilized platform, but Newman does not compensate for actual motion. Newman simply adds a separate motion of a different frequency to the existing motion of the vehicle. Column 2 line 9. "The present (Newman) invention is a significant departure from the prior art in which the components of motion are attempted to be cancelled or neutralized in order to provide a stable platform and thereby avoid motion sickness. Rather than attempting to offset or compensate such motions, the Newman system simply adds a relatively small, vertical motion of different frequency that breaks up the sickness inducing motion . . . Newman's theory is that breaking up of the fundamental frequency of the vertical movement that induces motion sickness negates the tendency of such movement to induce motion sickness."

Also Newman as in Powell, displays no level sensing upon the stable platform. Newman's sensors Column 3 line 34 state; "a plurality of sensors 16, 18 and 20 determine certain relative motions between platform 14 and vessel 10." These sensors would again be a motor encoder or similar sensor capable of determining the precise relationship between the platform and the vessel. They are not separate level sensors used for correcting error exhibited by other system sensors as taught in Grober U.S. Pat. No. 6,611,662 and in a preferred embodiment of the present invention.

In addition, in a further preferred embodiment, the present invention adds the ability to maintain the occupant on a specific magnetic heading by the use of a third orthogonal axis along the horizon line. The occupant can also be positioned to face any direction and still be stabilized. All of this stabilization can be controlled by remote control or wireless remote control.

Martinez U.S. Pat. No. 5,119,754 is titled "Boat Seat Stabilizing Apparatus" but it is not an electro-mechanical constant stabilization device.

SUMMARY OF THE INVENTION

In a preferred embodiment a small, lightweight, portable stabilization device embodies a stabilized platform which is stabilized in up to three orthogonal axes. The stabilized platform is an autonomous self-leveling device which compensates for vehicular pitch and roll and maintains a level horizon or other angle set by the operator. The stabilized platform in this preferred embodiment is fitted with a chair and will keep an occupant level with the horizon for the purpose of minimizing the motions which induce motion sickness. The platform can also operate in three orthogonal axes and maintain the occupant to face a specific direction or magnetic compass heading.

The occupant can control the device using a control panel. The controls would include but are not limited to; On/Off, horizontal angle of stabilization, speed of stabilization and direction to be faced when stabilizing in all three axes.

In an alternative embodiment, the stabilized platform has a table mounted to it. This stabilized work station allows work to be done in a moving environment where stabilization is preferable to prevent objects from rolling around, or where delicate operations require the objects to stay stationary.

In a further embodiment a table attaches to the stabilized chair, (or platform) allowing for a stabilized work station for both the operator and the objects upon the table. The desireability of such an embodiment would be apparent for a technician doing delicate work while on a moving vehicle. If both the technician and the work station are stabilized, then the relationship is similar to being on solid ground.

In another embodiment, the stabilized platform uses a similar electronic sensing and stabilizing control system to the chair and table, however the mechanical drive mechanisms are linear actuators rather than motor and gear drive mechanisms. The linear actuators provide a wider support footprint to accommodate wider, heavier and unbalanced loads. In one embodiment the stabilized platform is fitted with a bed.

In another embodiment the bed has a walkway and/or work station attached to the bed (or platform) which allows medical personnel and associated medical equipment to be stabilized relative to the patient. This configuration is a stabilized operating table and allows for delicate medical operations which might be difficult or impossible if the patient, medical staff, or delicate medical devices were subject to rolling and pitching.

Different types of drive mechanisms, not limited to linear actuators, motors, gears or belt drives can be used to support and move the stable platform, and will vary depending on the application and be apparent to one skilled in the art.

In one embodiment, the stabilized platform is moved by a set of actuators composed of motors and gears which are controlled by a series of sensors and control unit as described in Grober Ser. No. 09/579,723. In an alternative embodiment, the stabilized platform is moved by electronic linear actuators. In a further embodiment, the stabilized platform is moved by hydraulic actuators.

Compact size and light weight are of significant importance. In one embodiment, this invention allows scalability to be smaller or larger, but keeps the size and weight to the minimum size to meet the torque requirements of the object being stabilized.

All embodiments preferably have the option of allowing for an automatic braking system so that the stabilized platform, occupant or equipment being stabilized does not fall over if the power should be shut off or fail, but this braking system is not required.

All embodiments preferably can be controlled by a control panel attached directly to the device, and/or a remote control panel wired to the device, and/or a wireless remote control panel to control the device.

All embodiments preferably can receive sensor data or direct stabilization commands from the ship's gyro compass or other sensing source via hard wire or wireless remote control.

In a related embodiment, a group of anti-motion stabilized chairs are used as chairs for a tour vehicle, wherein the occupants are stabilized against motion sickness and the tour operator can control the pointing angle of the occupants so that all look in the same direction at the same time.

DETAILED DESCRIPTION OF THE PREFERRED EMBODIMENTS.

Figure 1:
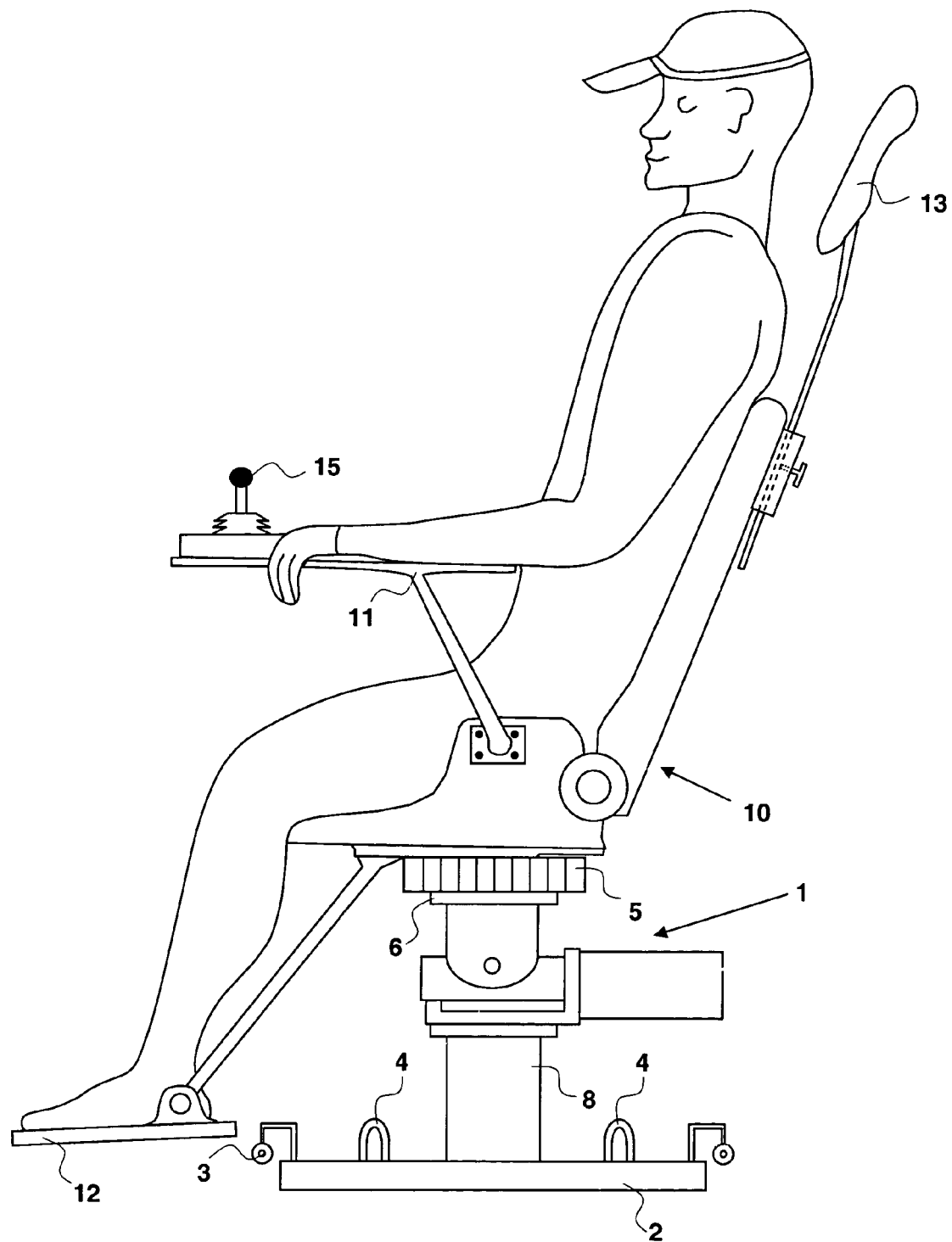
FIG. 1 is a side view of the stabilized platform with a chair mounted to it.

FIG. 1 illustrates an anti-motion sickness chair. According to this embodiment, the stabilization device 1, such as that described in Grober patent Ser. No. 09/579,723, Autonomous, Self Leveling, Self Correcting Stabilized Platform, is directly attached by base plate 2 to a vessel or vehicle deck. Optional wheels 3 can also be used for mobility and should have a locking device or attachment hardware 4 to secure the anti-motion sickness chair to the deck. The stabilized platform 6 is attached to the optional azimuth motor/gear drive unit 5. Chair 10 is fixed to the azimuth motor/gear drive unit 5. Support post 8, is attached between the stabilization device 1 and the base plate 2, and can be variable lengths depending on the particular application and for user comfort. An armrest or small table 11 can be attached to chair 10, providing a stable working surface for the occupant. A footrest 12 and headrest 13 can also be added.

The operator control device 15, gives the occupant control over On/Off, horizon level, speed of stabilization and azimuth position. The control device can be a remote control and/or a wireless remote control.

Figure 2:
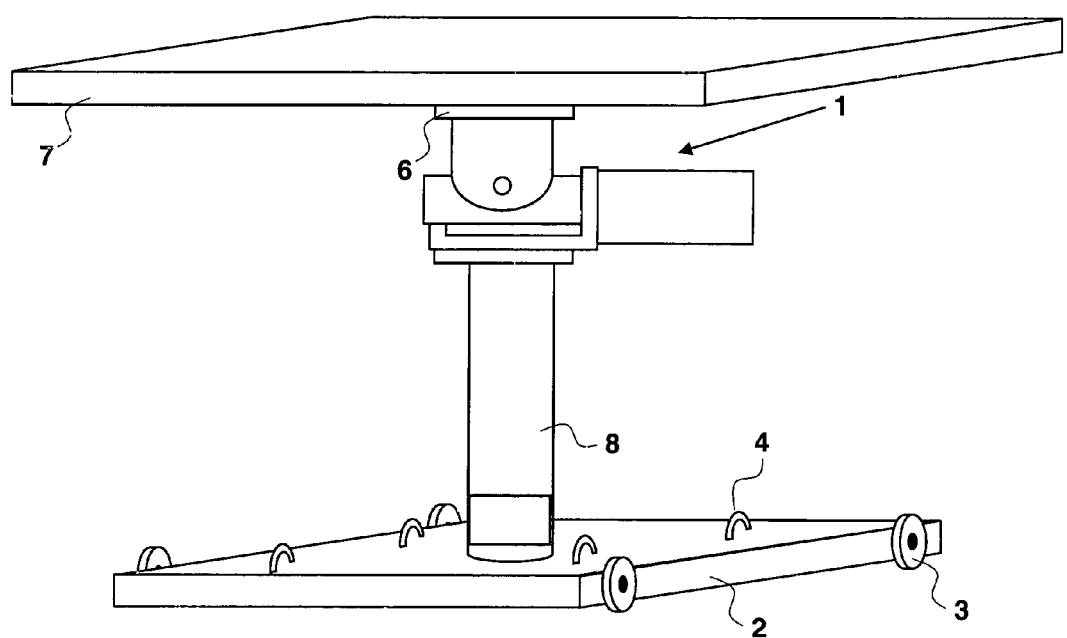
FIG. 2 is a side view of the stabilized platform with a table mounted to it.
Figure 3:
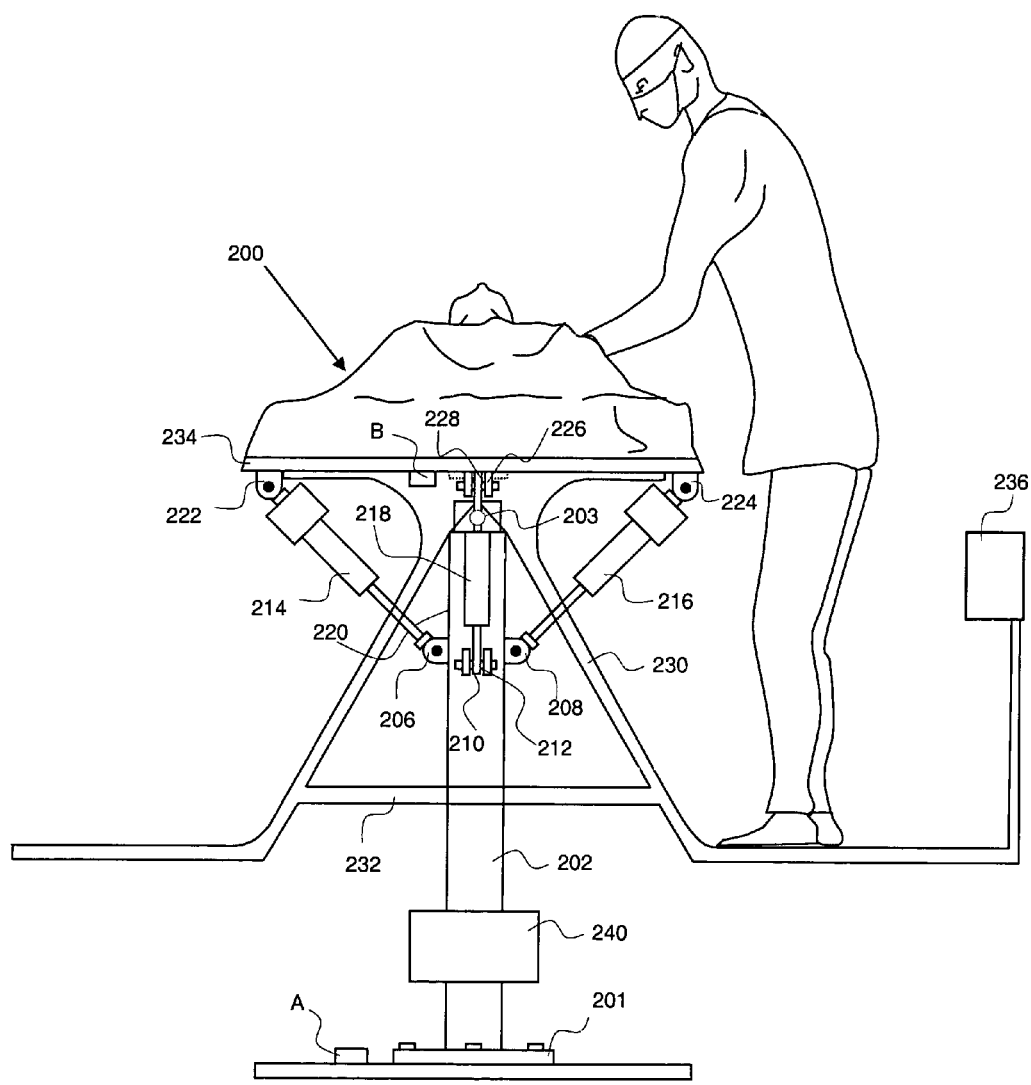
FIG. 3 is a side view a stabilized platform using similar electronic sensing and stabilizing control systems, however the mechanical drive mechanisms are linear actuators rather than motor and gear drive. This figure shows a medical bed and attached walkway and work station.

FIG. 2 is a side view of the stabilized platform with a table mounted to it. FIG. 3 is the stabilized platform using a similar electronic sensing and stabilizing control system, however the mechanical drive mechanisms are linear actuators rather than motor and gear drive mechanisms. The linear actuators provide a wider support footprint to accommodate wider, heavier and unbalanced loads. A walkway and work station are attached to the bed which allow medical personnel and associated medical equipment to be stabilized relative to the patient. Different types of drive mechanisms, not limited to linear actuators, gears or belt drives can be used to support and move the stable platform, and will vary depending on the application.

FIG. 2 shows the stabilization device 1, attached to post 8 which is attached to its base plate 2 which is attached the vehicle deck. The base plate 2 can include wheels 3 to give the stabilized table mobility. Attachment hardware 4 is used to secure the device to the vehicle if base plate 2 has not been permanently attached to the vehicle. Table top 7 is secured to the stabilization device top plate 6.

Figure 4:
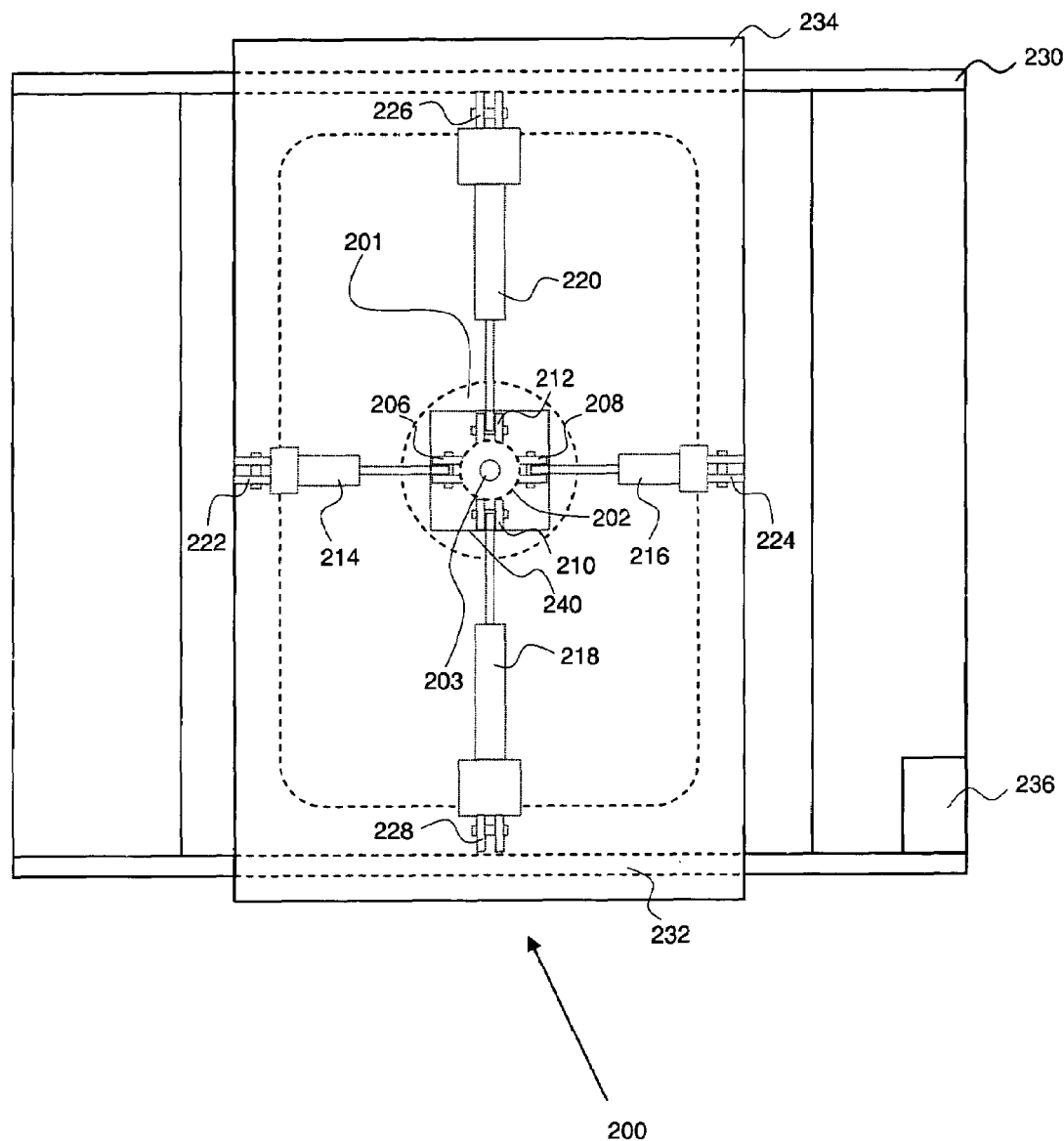
FIG. 4 is a top view of the stabilized bed of FIG. 3 and shows the mechanical aspects of the stabilized bed.

FIG. 3 illustrates a self-stabilized hospital or operating bed 200 for use on vehicles. The self-stabilized bed 200 includes a pedestal base plate 201 which is firmly secured to the floor of a boat or vehicle. A rigid post 202 is attached to the base plate 201 and supports a universal joint 203. The universal joint 203 connects the post 202 to a center or balance point of bed frame 234 and acts as a pivot point for the bed frame. Attachment points 206, 208, 210, and 212 shown in FIG. 4, are hinged or bearing surfaces which allow movement when attached to post 202. Attached to each of these bearings is a combination package containing a motor, linear actuator and braking mechanism. Each of these motor/actuator/brake packages 214, 216, 218, and 220 shown in FIG. 4, is designed to support the bed frame as well as move it in the proper direction to keep the bed horizontally stabilized. The opposing end of each of the motor/actuator/braking packages is attached to a respective bearing 222, 224, 228, and 226 shown in FIG. 4, which is securely attached to the bed frame 234.

Attached to the bed frame 234 is a platform 230 which is a one or more sided platform for supporting a doctor(s) and workstation 236. Platform 230 may vary in size and shape to accommodate one or more persons as well as medical equipment and work station(s) 236. Structural cross members 232 are added to platform 230 for additional strength as required. The stabilization device computer is located in control box 240 which in this embodiment is attached to post 202, but which can located at various locations on the vehicle or upon the bed for ease of use and access. Stabilization computer 240 receives information from sensor package A located on the vehicle, and sensor package B attached to the bed frame 234.

FIG. 4 is a top view of the stabilized bed of FIG. 3. The self-stabilized bed 200 includes a pedestal base plate 201 which is firmly secured to the floor of a boat or vehicle. A rigid post 202 is attached to the base plate 201 and supports a universal joint 203. The universal joint 203 connects the post 202 to a center or balance point of bed frame 234 and acts as a pivot point for the bed frame. Attachment points 206, 208, 210, and 212 are hinged or bearing surfaces which allow movement when attached to post 202. Attached to each of these bearings is a combination package containing a motor, linear actuator and braking mechanism. Each of these motor/actuator/brake packages 214, 216, 218, and 220 is designed to support the bed frame as well as move it in the proper direction to keep the bed horizontally stabilized. The opposing end of each of the motor/actuator/braking packages is attached to a respective bearing 222, 224, 226, and 228 which is securely attached to the bed frame 234. Opposing motor/actuator/brake packages 206 and 208 work jointly to maintain stability in one axis, while opposing motor/actuator/brake packages 210 and 212 work jointly to maintain stability of the second axis. The actual number and placement of the motor/actuator/brake packages is dependent upon the application. In an alternative embodiment only one motor/actuator/brake package may be required for each axis. In another embodiment, the motor/actuator/brake package may be replaced with an hydraulic actuator. The specific actuator device is determined by the application.

Attached to the bed frame 234 is a platform 230 which is a one or more sided platform for supporting a doctor(s). Platform 230 may vary in size and shape to accommodate one or more persons as well as medical equipment and work station (s) 236. Structural cross members 232 are added to platform 230 for additional strength as required. The stabilization computer is located in control box 240 which in this embodiment is attached to post 202.

Figure 5:
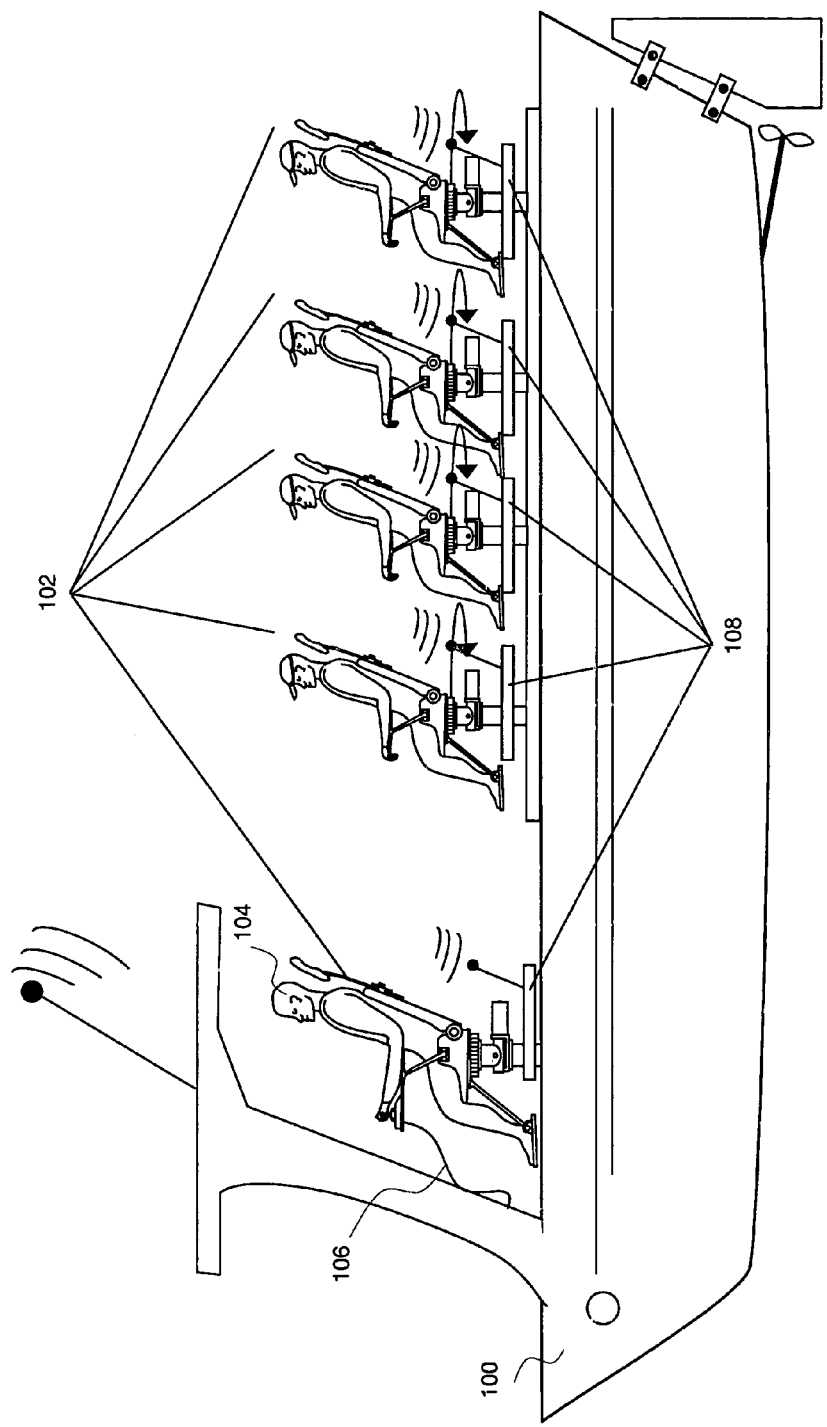
FIG. 5 is a tour boat showing multiple stabilized anti-motion sickness chairs which are controlled by the tour operator as to pointing direction.

FIG. 5 is an illustration of a tour boat outfitted with anti-motion sickness chairs. The boat 100 has multiple stabilized chairs 102 securely attached to the boat. The stabilized chairs may be slave chairs and receive or share the sensor and/or command data from a master chair, which could be the tour operator's stabilized chair or the ship's gyro compass. The tour operator has controls that allow him to face all the chairs in the same direction so that all the passengers can view the same things. The tour operator has a control panel which commands the chairs 102 either by hard wire 106 or by wireless control antennae 108.

While the invention has been described in detail with reference to the preferred embodiments thereof, it will be apparent to one skilled in the art that various changes and modifications can be made and equivalents employed, without departing from the present invention.

What is claimed is:

1. A stabilizing device comprised of:
   a stabilized payload platform for supporting a person(s) or item(s) to be stabilized;
   a base mounted to a vehicle or moving object,
   a stabilizing system connecting the stabilized payload platform to the base, the stabilizing system including;
   a sensor package A for sensing motion of the vehicle about two or three perpendicular axes,
   a sensor package B fixed to the stabilized payload platform and which includes level sensor means,
   the stabilizing system having the means to orient the stabilized payload platform to at least one stabilized orientation including stabilized oriented to;
   earth's horizon,
   apparent gravity horizon
   a range of orientations between the earth's horizon and the apparent gravity horizon.

2. The stabilizing device of claim 1 including;
   a powered drive mechanism for moving each axis being stabilized,
   a braking system which prevents the stabilized payload platform from falling over when the powered drive mechanism is shut off, is disconnected or fails.

3. The stabilizing device of claim 1 including;
   at least one or more of a chair, table, bed, medical operating table, a room, or any other item to be stabilized and which provides the occupant(s) or item(s) with stabilization in at least two axes.

4. The stabilizing device of claim 1 wherein the payload platform can be operated in an inverted position and allow an item needing stabilization to be hung from the stabilized platform.

5. The stabilizing device of claim 1 wherein the stabilization is autonomous and self correcting.

6. The stabilizing device of claim 1 wherein the stabilizing device is scalable to be smaller or larger.

7. The stabilizing device of claim 1 wherein the occupant (s) or item(s) are stabilized in a magnetic direction.

8. The stabilizing device of claim 1 wherein the device is portable and can be moved from location to location.

9. The stabilizing device of claim 1 wherein the device can be controlled by at least one of;
   an occupant, or a separate operator to control one or more of;
   on/off control,
   speed of stabilization,
   angle of the stabilized payload platform,
   azimuth angle of the stabilized payload platform.

10. The stabilizing device of claim 1 which can be controlled by wired or wireless remote control.

11. The stabilizing device of claim 1 wherein the stabilized payload platform can maintain a compass heading.

12. A method for stabilizing a platform comprised of the steps of;
    providing a stabilized payload platform,
    providing a base mounted to a vehicle or moving object,
    providing a stabilizing system connected between the stabilized payload platform and the base, the stabilizing system including;
    a sensor package A for sensing motion of the vehicle or moving object about two or three perpendicular axes,
    a sensor package B fixed to the stabilized payload platform and which includes level sensor means,
    providing the stabilizing system with the means to orient the stabilized payload to at least one stabilized orientation including stabilized relative to;
    earth's horizon,
    apparent gravity horizon,
    a range of orientations between the earth's horizon and the apparent gravity horizon.

13. The method of claim 12 including,
    providing a powered drive mechanism for moving each axis being stabilized, providing a braking system for preventing the stabilized platform from falling over when the powered drive mechanism is shut off, disconnected or fails.

14. The method for stabilizing of claim 12 wherein there is the step of providing at least one or more of a chair, table, bed, medical operating table, room or other item(s) to be stabilized.

15. The method for stabilizing of claim 12 wherein there is the step of performing medical procedures wherein one or more of the persons or items involved with the medical procedure are stabilized.

16. The method of claim 12 including grouping more than one stabilizing devices on a vehicle or moving object.

17. The method of claim 12 including providing controls allowing at least one of;
    an occupant or an operator to control one or more of;
    on/off control,
    speed of stabilization,
    angle of the stabilized payload platform,
    azimuth angle of the stabilized payload platform.

18. The method of claim 12 further comprising providing a one or more stabilized devices on vehicle wherein the occupants are being stabilized.

19. A stabilizing device comprised of:
- a stabilized payload platform for supporting a person(s) or item(s) to be stabilized;
- a base mounted to a vehicle or moving object,
- a stabilizing system connecting the stabilized payload platform to the base, the stabilizing system including;
- a sensor package A for sensing motion of the vehicle or object about two or three perpendicular axes,
- a sensor package B, fixed relative to the stabilized payload platform, and which includes level sensor means,
- a control system having the means or a variable control, and using relationships between sensor package A and sensor package B to,
- orient the stabilized payload platform to more than one stabilized orientation including stabilized relative to;
- earth's horizon,
- apparent gravity horizon
- a range of orientations between the earth's horizon and the apparent gravity horizon.

20. The stabilizing device of claim 19 wherein there are one or more stabilizing devices on a vehicle wherein the occupants are stabilized.

* * * * *